(12) United States Patent
Kim et al.

(10) Patent No.: US 8,009,865 B2
(45) Date of Patent: Aug. 30, 2011

(54) APPARATUS, METHOD, AND MEDIUM FOR TRACKING GESTURE

(75) Inventors: Kyu-yong Kim, Yongin-si (KR); Won-chul Bang, Seongnam-si (KR); Yeun-bae Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1035 days.

(21) Appl. No.: 11/896,110

(22) Filed: Aug. 29, 2007

(65) Prior Publication Data

US 2008/0107303 A1    May 8, 2008

(30) Foreign Application Priority Data

Nov. 3, 2006   (KR) .......................... 10-2006-0108510

(51) Int. Cl.
*G06K 9/00* (2006.01)
*H04N 7/18* (2006.01)
*H04N 5/225* (2006.01)

(52) U.S. Cl. ........................... 382/103; 348/77; 348/169

(58) Field of Classification Search .................. 382/103, 382/107, 236, 104, 291; 348/154, 155, 169, 348/170, 171, 172, 77, 94, 143; 715/863
See application file for complete search history.

(56) References Cited

U.S. PATENT DOCUMENTS

| | | | | |
|---|---|---|---|---|
| 5,982,352 A | * | 11/1999 | Pryor | 345/156 |
| 6,801,637 B2 | * | 10/2004 | Voronka et al. | 382/103 |
| 7,087,914 B2 | * | 8/2006 | Akins et al. | 250/504 R |

FOREIGN PATENT DOCUMENTS

| | | |
|---|---|---|
| KR | 2003-0021988 | 3/2003 |
| KR | 2003-0037692 | 5/2003 |

OTHER PUBLICATIONS

Christian von Hardenberg et al. *Bare-Hand Human-Computer Interaction*. Proceedings of the ACM Workshop on Perceptive User Interfaces. Orlando, Florida, USA. Nov. 15-16, 2001.

* cited by examiner

*Primary Examiner* — Abolfazl Tabatabai
(74) *Attorney, Agent, or Firm* — Staas & Halsey LLP

(57) ABSTRACT

Provided is an apparatus, method, and medium for tracking a gesture, wherein, after a user is positioned approximately, a specific part of the user's body is tracked continuously. The gesture-tracking apparatus includes a positioning unit positioning a user appearing in an inputted image and a target-tracking unit tracking a first body part of the user.

26 Claims, 8 Drawing Sheets

APPARATUS, METHOD, AND MEDIUM FOR TRACKING GESTURE

This application claims priority benefit from Korean Patent Application No. 10-2006-0108510 filed on Nov. 3, 2006 in the Korean Intellectual Property Office, the disclosure of which is incorporated herein by reference in its entirety.

BACKGROUND

1. Field

Embodiments relate to an apparatus, a method, and a medium for tracking a gesture. More particularly, embodiments relate to an apparatus, a method, and a medium for tracking a gesture, wherein, after a user is positioned, a specific part of the user's body is tracked continuously.

2. Description of the Related Art

As is generally known in the art, infrared transceiver modules are widely used in various digital devices and communication devices so as to process signals in such a manner that various types of data can be transmitted and received wirelessly over a short range. As a result, the scope of application of remote control technologies is extended from peripheral devices (e.g., TVs, VCRs) to industrial electronic systems (e.g., interactive TVs, laptop computers, digital cameras, and mobile communication terminals).

Most devices used in homes or offices can be operated by using a remote control. Particularly, as long as a user stays within a predetermined distance from a device, he/she can turn on/off the device or select a desired function by operating corresponding buttons on the remote control.

Most audio and video devices are now equipped with a remote control. Furthermore, integrated remote control technology has recently appeared so that different types of peripheral devices can be operated by a single remote control.

However, remote controls are easily lost, and, when broken, users cannot operate devices from a distance.

Therefore, a method, apparatus, and medium for enabling users to operate devices from a distance without remote controls is needed.

SUMMARY

Accordingly, an aspect of embodiments has been made to solve the above-mentioned problems occurring in the prior art, and an aspect of embodiments provides an apparatus, a method, and a medium for tracking a gesture, wherein, after a user is positioned approximately based on image processing technology, a specific part of the user's body is tracked continuously based on laser technology.

Another aspect of embodiments provide an apparatus, a method, and medium for tracking a gesture, wherein a specific part of a user's body is tracked by using a laser, exempting sensitive parts (e.g., eyes).

In an aspect of embodiments, there is provided a gesture-tracking apparatus including a positioning unit to position a user to appear in an inputted image and a target-tracking unit to track a first body part of the user in the inputted image.

In an aspect of embodiments, there is provided a gesture-tracking method including operations of positioning a user to appear in an inputted image and tracking a first body part of the user in the inputted image.

In an aspect of embodiments, there is provided a gesture tracking apparatus including a positioning unit to position a user, having a first body part and a second body part, to appear in an inputted image; a control unit to control a path-modification unit to modify a path of a laser beam so that the laser beam is directed to the first body part and away from the second body part; a light-reception unit to receive light resulting from scattering of the laser beam directed to the first body part; and a trajectory measurement unit to measure a movement trajectory of the first body part with reference to an intensity of the received light and the modified emission path.

According to another aspect of embodiments, there is provided at least one computer readable medium storing computer readable instructions to implement methods of embodiments.

BRIEF DESCRIPTION OF THE DRAWINGS

These and/or other aspects, features, and advantages will become apparent and more readily appreciated from the following description of exemplary embodiments, taken in conjunction with the accompanying drawings of which.

DETAILED DESCRIPTION OF EMBODIMENTS

Reference will now be made in detail to exemplary embodiments, examples of which are illustrated in the accompanying drawings, wherein like reference numerals refer to the like elements throughout. Exemplary embodiments are described below by referring to the figures.

Figure 1:
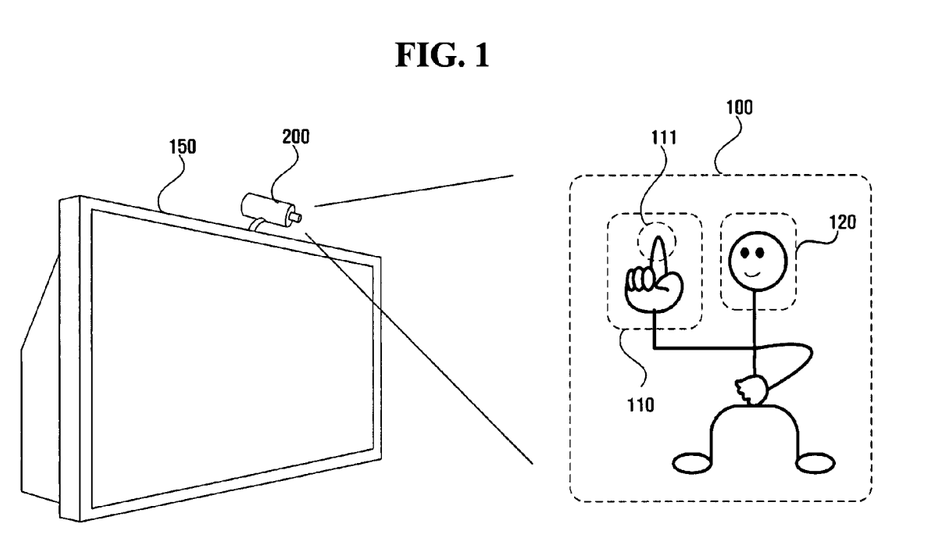
FIG. 1 is a conceptual diagram showing a process of tracking a user's gesture according to an exemplary embodiment.

FIG. 1 is a conceptual diagram showing a process of tracking a user's gesture according to an exemplary embodiment.

An apparatus 200 for tracking a user's gesture (hereinafter, referred to as a gesture-tracking apparatus) is adapted to recognize the user's gesture and transmit a function (control) signal, which corresponds to the recognized gesture, to an apparatus 150 for performing a predetermined function (hereinafter, referred to as a function-performing apparatus), which is connected to the gesture-tracking apparatus 200, so that the function-performing apparatus 150 performs the predetermined function. The predetermined function may also be referred to as a predetermined operation.

Specifically, the gesture-tracking apparatus 200 positions the user. To this end, the gesture-tracking apparatus 200 may have an image-input unit and an image-processing unit for processing an inputted image 100 so as to position the user appearing in the inputted image 100.

With reference to the positioned user, the gesture-tracking apparatus 200 scans a predetermined region 110 (hereinafter, referred to as a first region) to sense a target 111 to be tracked (hereinafter, referred to as a first body part). For example, the gesture-tracking apparatus 200 may scan a region 110 to the right of the user's face as shown in FIG. 1.

Lasers may be used to scan the first region 110. Particularly, the gesture-tracking apparatus 200 emits a series of laser beams to the first region 110 to sense the first body part 111, which is shown in FIG. 1 to be the second finger of the user's right hand. Upon sensing the second finger, the gesture-tracking apparatus 200 may recognize it as the first body part 111. The gesture-tracking apparatus 200 may also recognize a protrusion of a different object existing in the first region 110 as the first body part 111. The gesture-tracking apparatus 200 may recognize a ballpoint pen or a coin, for example, as the first body part 111 even though they are not a part of the user's body.

After positioning the first body part 111, the gesture-tracking apparatus 200 can track it. Particularly, the gesture-tracking apparatus 200 emits lasers to the first body part 111. If the user moves the first body part 111 after it has been positioned, the gesture-tracking apparatus 200 modifies the path of the laser based on the movement so that the lasers are directed to the first body part 111 without interruption. Such movement tracking may be performed by receiving light created by scattering of the lasers emitted to the first body part 111 and analyzing the light.

When the gesture-tracking apparatus 200 tracks the movement of the first body part 111 using lasers, there is a possibility that the laser may be directed to a part of the user's body that is sensitive to light (e.g., eyes), according to an unconscious gesture by the user.

Lasers can be classified into those having little effect on human bodies and those having a serious effect. Even the former may seriously affect users after a long period of exposure. Considering this, it is preferable to keep lasers away from parts of the user's body that are sensitive to light (e.g., eyes).

In order to keep lasers away from a specific part of the user's body (hereinafter, referred to as a second body part) during positioning of the user, the gesture-tracking apparatus 200 determines a region 120 in which the second body part is positioned (hereinafter, referred to as a second region). For example, the gesture-tracking apparatus 200 determines a second region 120 near the user's face, as shown in FIG. 1.

As such, if the target of laser beams is included in the second region 120 while tracking the first body part 111 of the user, the gesture-tracking apparatus 200 restricts the emission of laser beams or modifies the emission path thereof.

Figure 2:
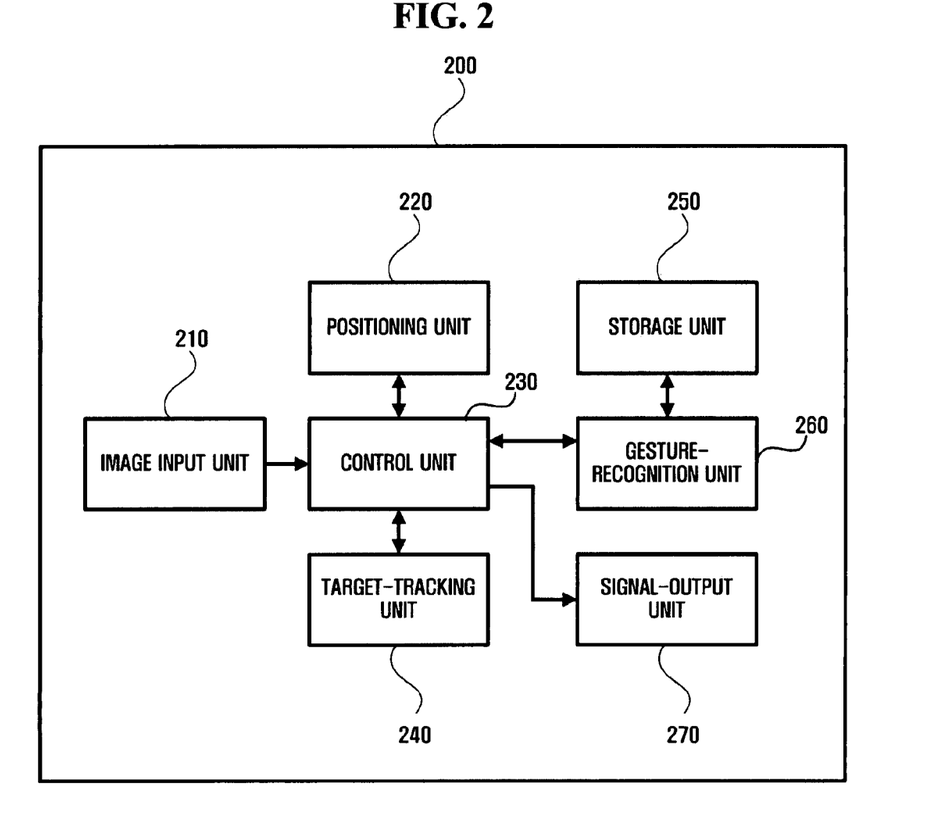
FIG. 2 is a block diagram showing a gesture-tracking apparatus according to an exemplary embodiment.

FIG. 2 is a block diagram showing a gesture-tracking apparatus according to an exemplary embodiment. The gesture-tracking apparatus 200 includes an image input unit 210, a positioning unit 220, a control unit 230, a target-tracking unit 240, a storage unit 250, a gesture-recognition unit 260, and a signal output unit 270.

The image input unit 210 is adapted to receive an input of images, particularly analog images. To this end, the image input unit 210 may have an imaging device, such as a CCD (Charge Coupled Device) or CMOS (Complementary Metal Oxide Semiconductor).

The image input unit 210 controls the gain of an inputted image signal and amplifies the signal by a predetermined amount so that the signal can be processed easily in a subsequent operation. The image input unit 210 may have a conversion unit (not shown) for converting the amplified analog image signal into a digital signal.

Preferably, the range of images inputted to the image input unit 210 is larger than the tracking range of lasers generated by the target-tracking unit 240, because any target included in the tracking range, even if it is a part of an inputted image, can be tracked by the target-tracking unit 240.

The positioning unit 220 is adapted to position the user appearing in an inputted image. To this end, the positioning unit 220 processes a digital image from the image input unit 210 by using a technique such as edge detection or pattern recognition.

According to an exemplary embodiment, it is enough to position the user approximately. That is to say, the positioning unit 220 may target a stationary user, not a moving user, in order to position him/her. Particularly, the positioning unit 220 does not use all frames from the image input unit 210, but only one of them (i.e., a still image) to position the user. Depending on the computational ability, the positioning unit 220 may also use all of the inputted still images (i.e., moving pictures) to position the user.

After positioning the user, the positioning unit 220 positions the first and second regions 110 and 120. Particularly, with reference to the positioned user, the positioning unit 220 positions the first region 110, in which the first body part is expected to exist, and the second region 120, in which the second body part is expected to exist.

After positioning the user, the first region 110, and the second region 120, the positioning unit 220 transmits the result of positioning to the control unit 230 and stops the positioning process.

Unlike the positioning unit 220 adapted to position the user approximately, the target-tracking unit 240 (described later) tracks the moving first body part 111 without interruption. If the target-tracking unit 240 cannot track the first body part 111 any more, for example, if the user has moved out of the view angle of the image input unit 210 or if the first body part 111 is covered by the user or another object, the positioning unit 220 resumes the positioning process. More particularly, the target-tracking unit 240 continuously notifies the control unit 230 of the result of tracking of the first body part 111. When notified that the first body part 111 cannot be tracked any more, the control unit 230 controls the positioning unit 220 so as to resume the positioning process.

Figure 3:
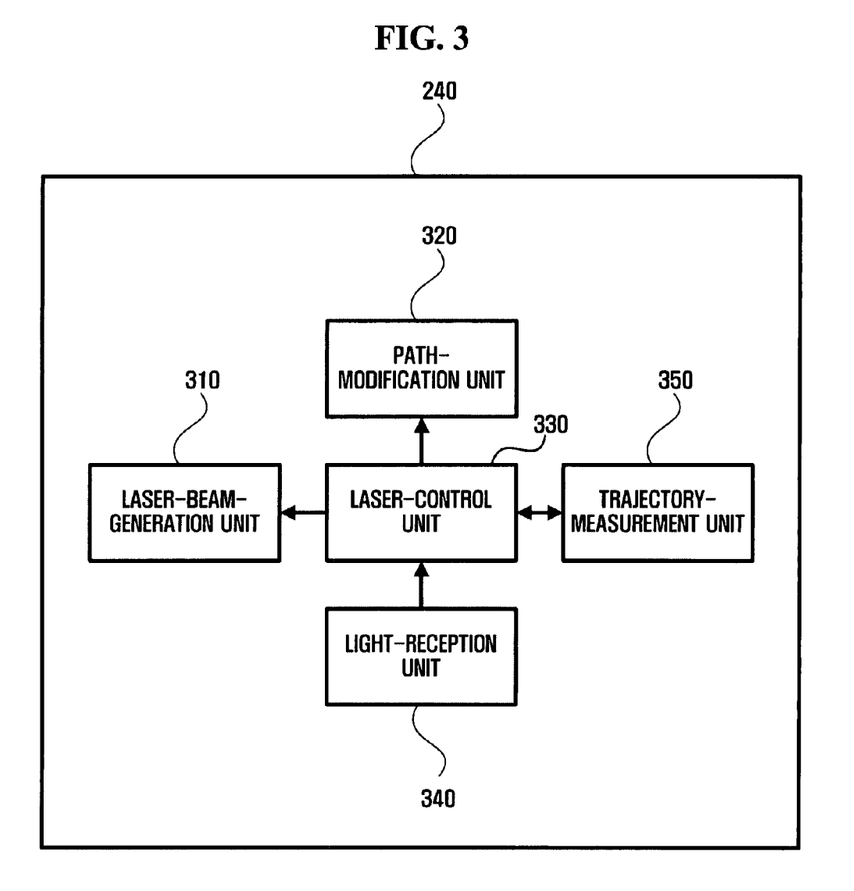
FIG. 3 is a block diagram showing an exemplary embodiment of a target-tracking unit of the gesture-tracking apparatus shown in FIG. 2.

The target-tracking unit 240 is adapted to track the first body part 111 of the user, which is a moving object. To this end, the target-tracking unit 240 includes at least one of a laser-beam-generation unit 310, a path-modification unit 320, a laser control unit 330, a light-reception unit 340, and a trajectory measurement unit 350 as shown in FIG. 3.

The laser-beam-generation unit 310 is adapted to generate laser beams, which may be directed not in a direction along a straight line, but along a circle with a predetermined radius. Upon reflecting off an illuminated object, the lasers are scattered, and the resulting light is received by the light-reception unit 340. If the illuminated object moves while lasers are directed to it along a circle, the type of scattered light varies accordingly and is used to sense the direction of movement of the target. The method for analyzing the type of scattered light and sensing the direction of movement of the target will be described later in more detail with reference to FIG. 4.

The path-modification unit 320 is adapted to modify the path of the laser. To this end, the path-modification unit 320 may include a reflection mirror for reflecting lasers generated by the laser-beam-generation unit 310 and a driving unit for adjusting the angle of the reflection mirror.

Figure 5:
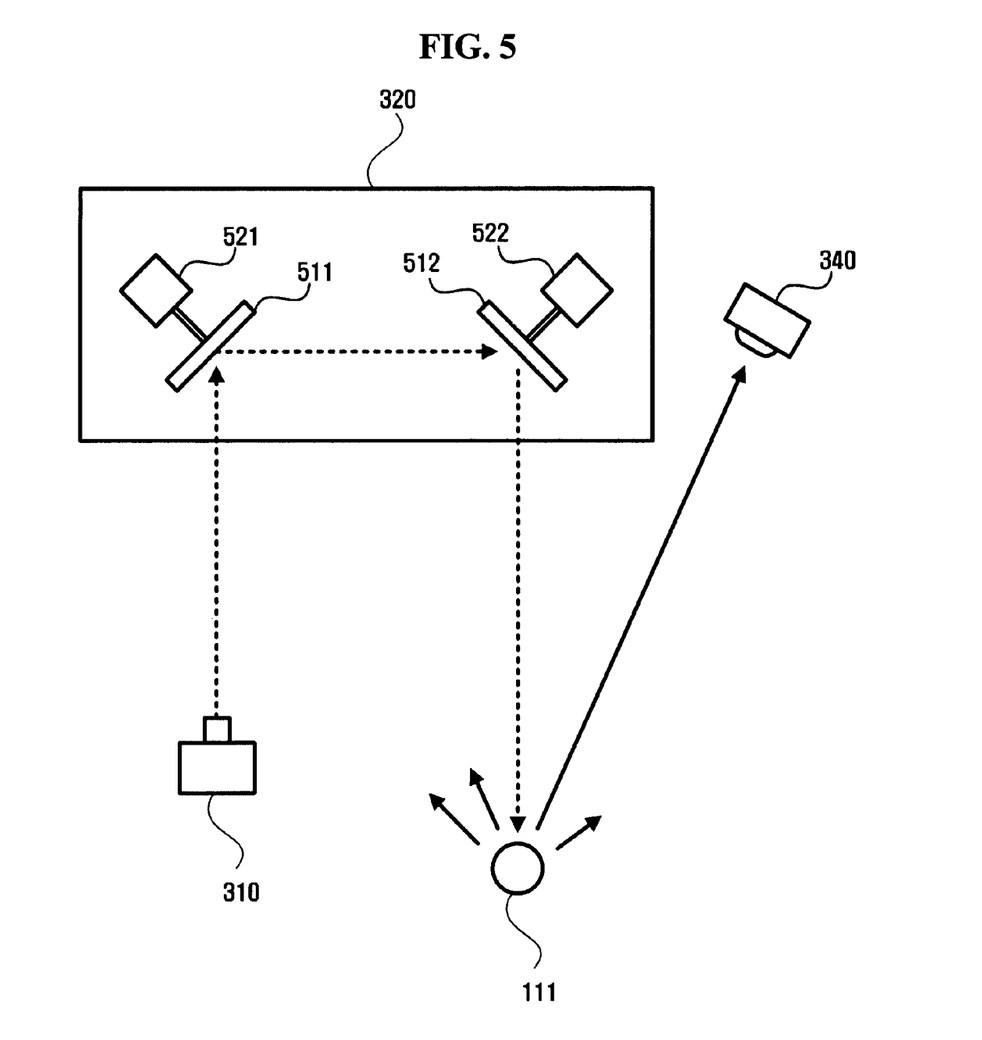
FIG. 5 shows a process of modifying the path of the laser according to an exemplary embodiment.

FIG. 5 shows a process of modifying the path of the laser according to an exemplary embodiment. The path-modification unit 320 has two reflection mirrors 511 and 512, i.e. vertical and horizontal reflection mirrors, and driving units 511 and 522 for modifying their angle precisely so that the path of lasers generated by the laser-beam-generation unit 310 is modified. The above-mentioned circular lasers are created by precisely modifying the angle of the vertical and horizontal reflection mirrors 511 and 512.

As such, the lasers are directed by the path-modification unit 320 to the first body part 111, and are reflected by it. The resulting scattered light is transmitted to the light-reception unit 340.

Although two reflection mirrors 511 and 512 and two driving units 521 and 522 are used in FIG. 5 to modify the path of the laser, three or more reflection mirrors and driving units may be used if necessary. Alternatively, a single driving unit capable of modifying both vertical and horizontal angles may be used to control a single reflection mirror so that the path of the laser is modified.

As mentioned above, the laser tracking of the first body part 111 is based on images inputted to the image input unit 210. To this end, the direction of images inputted to the image input unit 210 is preferably parallel to the direction of lasers directed by the path-modification unit 320. This is for the purpose of avoiding any range detection error resulting from a discrepancy between both directions.

Figure 6:
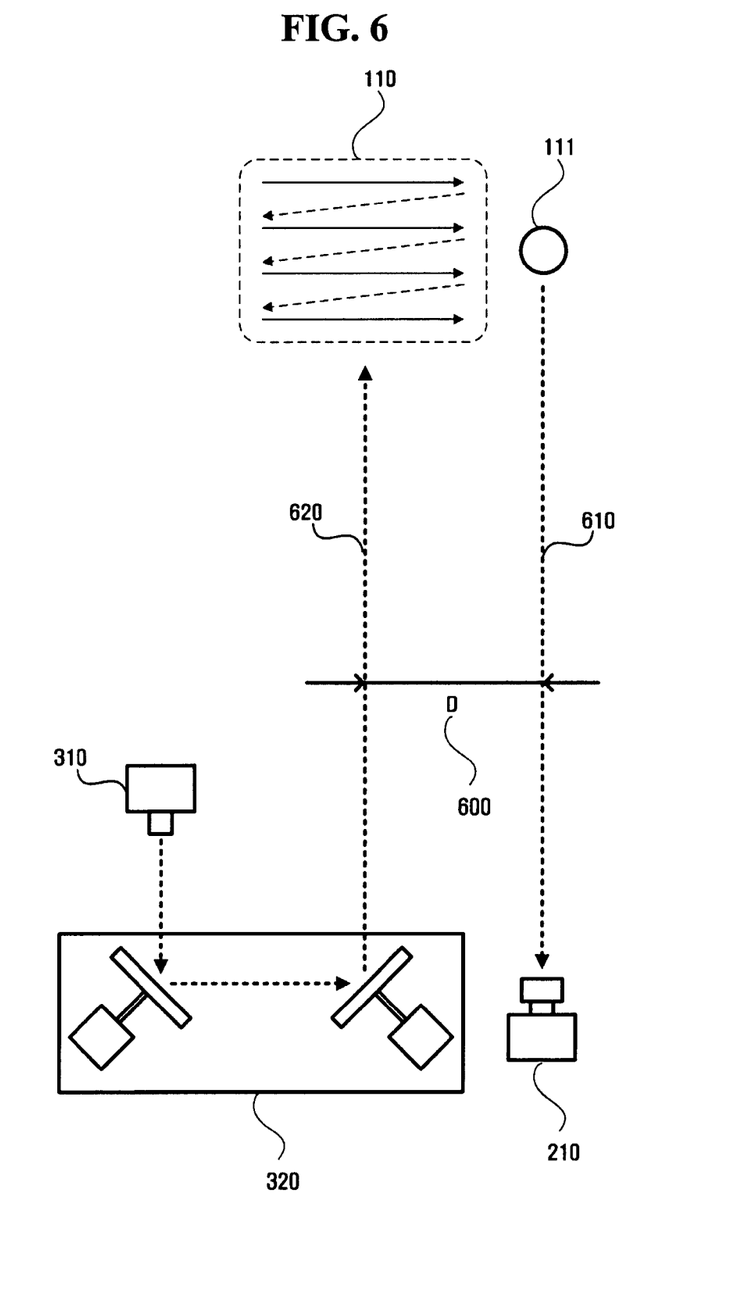
FIG. 6 shows the relationship between an image-input direction and a laser emission direction according to an exemplary embodiment.

FIG. 6 shows the relationship between an image-input direction and a laser emission direction according to an exemplary embodiment. It is clear from the drawing that the distance D 600 between the central axis 610 of the image-input direction and the central axis 620 of the laser emission direction may result in an error in tracking the first body part 111 initially.

Particularly, when the first body part 111 exists in the direction of input to the image input unit 210, the path-modification unit 320 performs scanning with reference to the central axis 620 of the laser emission direction. If the distance 600 between the central axes is large, the first body part 111 may not exist in the first region 110, which is recognized by the path-modification unit 320.

Therefore, the distance between the central axis 610 of the image-input direction and the central axis 620 of the laser emission direction is preferably minimized while maintaining them in parallel.

Referring to FIG. 3 again, the laser control unit 330 is adapted to position the first body part 111 in the first region 110 by using laser scanning. Particularly, the laser control unit 330 scans the first region 110 while controlling the path-modification unit 320 so as to modify the path of the laser. Based on the scanning result, the laser control unit 330 positions the first body part 111. It can be understood by those skilled in the art that the scanning, as used herein, refers to emitting lasers to the entire first region 110 and receiving the resulting scattered light.

The first body part 111, which is to be identified through the scanning, may be a protrusion of a part of the user's body existing in the first region 110, or a specific shape of object connected to a part of the user's body.

The first body part 111 may include at least one body part having a priority among the user's body parts. For example, if the priority is given in the following order: the right hand's second finger, left hand's second finger, right hand's thumb, and left hand's thumb, the laser control unit 330 initially checks whether the right hand's second finger can be searched for. If not, the laser control unit 330 searches for the left hand's second finger. The laser control unit 330 may perform similar searching with regard to all body parts having the priority.

As mentioned above, the positioning unit 220 positions not only the first region 110, but also the second region 120. Based on the positioning result, the laser control unit 330 may control the path of the laser so as to keep laser beams away from the second region 120. If laser beams have been directed into the second region 120, the laser control unit 330 may restrict the generation of lasers.

As such, the laser control unit 330 controls the path-modification unit 320 and the laser-beam-generation unit 310 so as to modify the path of the laser or restrict the laser generation, in order to keep laser beams away from the user's body parts that are not supposed to be exposed to lasers (e.g., eyes). If necessary, more than one second region 120 may be set up.

The path-measurement unit 350 is adapted to measure the trajectory of the laser beam, which is modified by the path-modification unit 320. Particularly, the path-measurement unit 350 measures the type of movement of the first body part 111 so that the gesture-recognition unit 260 (described later) uses the result of measurement as a basis for recognizing the user's gesture. The trajectory measurement unit 350 can measure the three-dimensional trajectory of the first body part 111 by using the intensity of light incident on the light-reception unit 340 and the rotational angle of at least one reflection mirror included in the path-modification unit 320.

Referring to FIG. 2, the gesture-recognition unit 260 uses the trajectory transmitted by the trajectory measurement unit 350 so as to recognize a gesture made with the first body part 111. Particularly, the gesture-recognition unit 260 analyzes the characteristics of the transmitted trajectory and compares the result of analysis with gesture codes stored in the storage unit 250. If the comparison shows a correspondence, the gesture-recognition unit 260 extracts a function (control) signal, which has been stored together with a corresponding gesture code. To this end, the storage unit 250 may store at least one gesture code and a corresponding function (control) signal.

As used herein, the function signal refers to a signal used to cause the function-performing apparatus 150 to perform a predetermined function. If the function-performing apparatus 150 is a TV, for example, the function (control) signal may be used for power control, channel switching, or volume adjustment.

The signal output unit 270 is adapted to output a function signal, and transmits it to the function-performing apparatus 150, which then performs a corresponding function.

Figure 4:
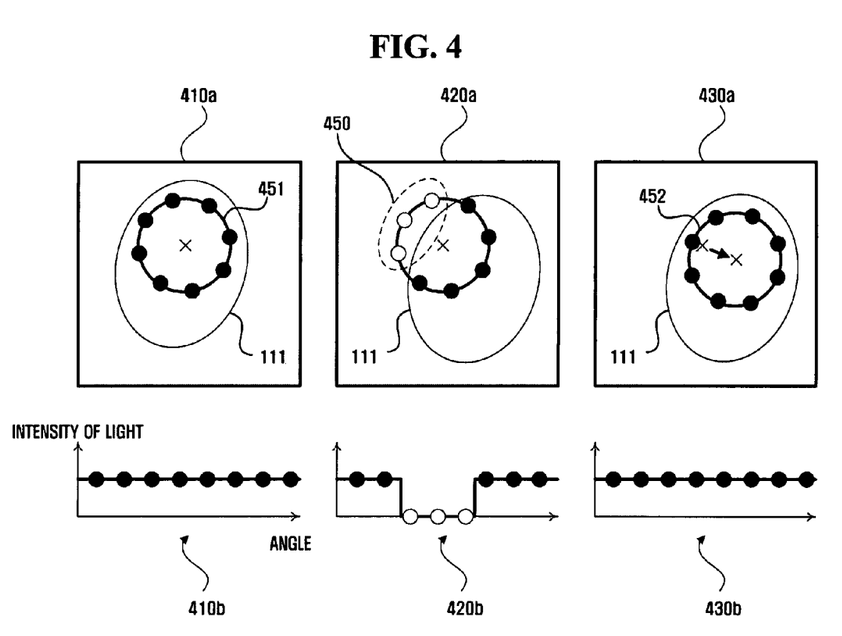
FIG. 4 shows a process of sensing and tracking the movement of a first body part according to an exemplary embodiment.

FIG. 4 shows a process of sensing and tracking the movement of a first body part according to an exemplary embodiment.

In the drawing, reference numeral 410a refers to a view of a first body part 111 irradiated with a circular laser 451. It is clear from the view that the circular laser 451 is completely included in the first body part 111. The laser is reflected and scattered by the first body part 111, and the resulting scattered light is received by the light-reception unit 340, as indicated by reference numeral 410b. The scattered light has a uniform level of intensity, because the circular laser 451 is completely included in the first body part 111.

Reference numeral 420a refers to a view of a first body part 111 after a movement. It is clear from the view that a portion 450 of the circular laser 451 lies outside the first body part 111. As a result, the intensity of light reflected and scattered inside the first body part 111 differs from that of light reflected and scattered outside the first body part 112, as indicated by reference numeral 420b.

If the intensity of scattered light is as given in the view labeled 420b, the laser control unit 330 controls the path-modification unit 320 so as to modify the path of the laser. Particularly, the path of the laser is moved in a direction opposite the portion 450 of the circular laser 451, which lies outside the first body part 111, so that the circular laser 452 is again included in the first body part 111 completely as indicated by reference numeral 430a. As a result, the intensity of scattered light becomes uniform as indicated by reference numeral 430b.

The laser control unit 330 can position the first body part 111 in the three-dimensional space based on the change of intensity of scattered light, as well as the overall intensity of incident scattered light, and control the path-modification unit 320 so as to modify the path of the laser accordingly. The size of the circle may vary depending on the distance between the gesture-tracking apparatus 200 and the first body part 111. Namely, the laser control unit 330 may adjust the size of the circle with reference to the distance to the first body part 111.

If the first body part 111 is covered by the user or another object, or if the first body part 111 has moved out of the tracking range of the path-modification unit 320, the intensity of scattered light incident on the light-reception unit 340 may decrease. When the intensity of incident light drops below a threshold, the laser control unit 330 considers that the first body part 111 cannot be tracked any more and notifies the control unit 230 of the result. Then, the control unit 230 controls the positioning unit 220 so as to position the user, the first region 110, and the second region 120 again.

Figure 7:
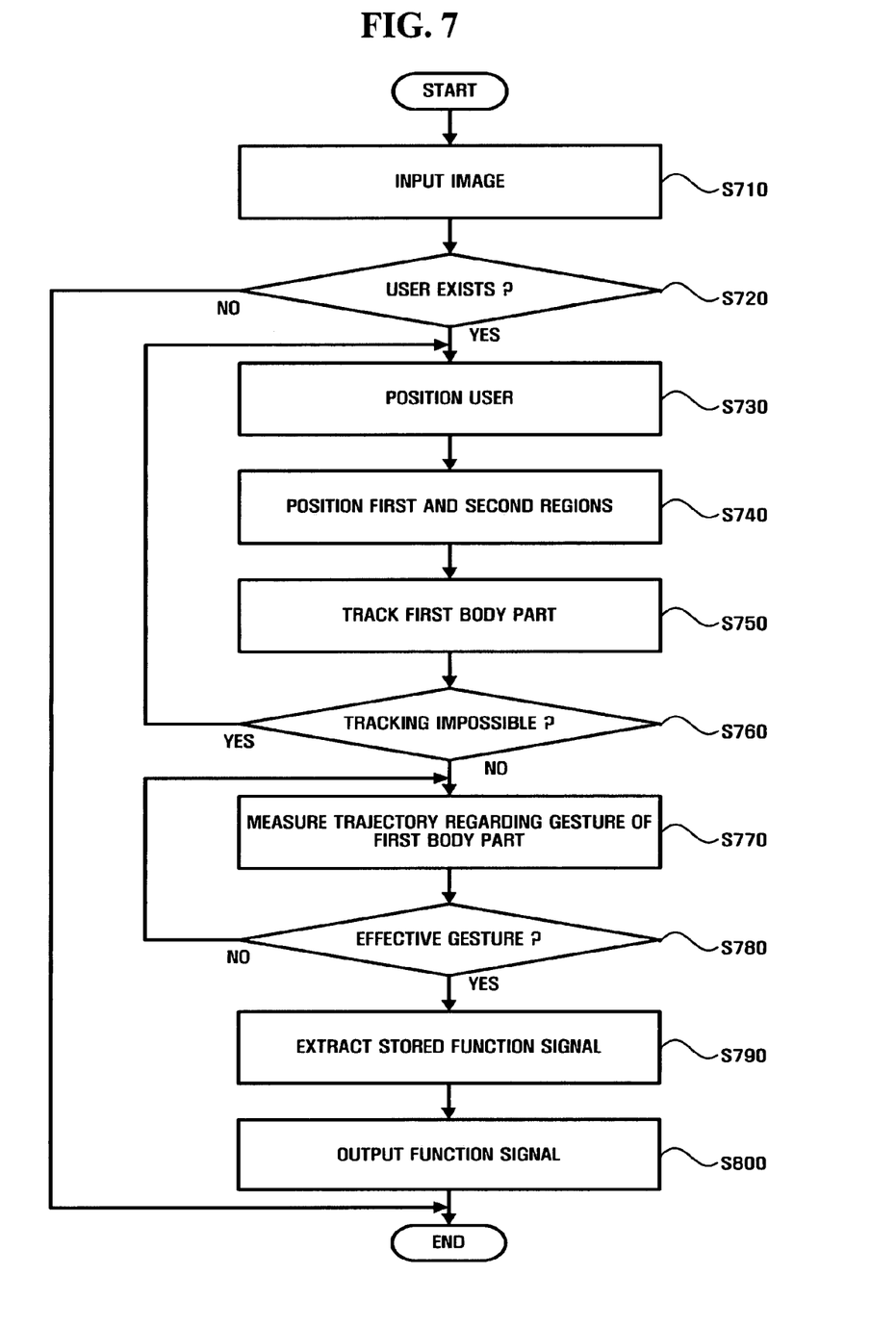
FIG. 7 is a flowchart showing a process of recognizing a user's gesture according to an exemplary embodiment.

FIG. 7 is a flowchart showing a process of recognizing a user's gesture according to an exemplary embodiment.

In order to recognize the user's gesture, the image input unit 210 of the gesture-tracking apparatus 200 receives an input of an image S710. The inputted image, i.e. an analog image, is converted into a digital image and is transmitted to the control unit 230.

Upon receiving the digital image, the control unit 230 checks whether or not the target (i.e., the user) exists within the image S720. Particularly, a plurality of users may exist in the received image, or only a part of a user's body may be included therein. It is also possible that no user exists in the image. The control unit 230 is adapted to check whether an effective user exists as the target.

If an effective user exists as the target among a plurality of users, or if a part of a user's body deserves to be regarded as a user, the control unit 230 causes the positioning unit 220 to position the user S730. The process of confirming the existence of a user as the target or recognizing a user from a part of his/her body may be based on technologies including face recognition, edge detection, and pattern recognition.

In response to a control command from the control unit 230, the positioning unit 220 positions the user. With reference to the positioned user, the positioning unit 220 positions the first and second regions 110 and 120 S740.

The result of positioning of the first and second regions 110 and 120 is transmitted to the target-tracking unit 240, which begins to track the first body part 111 existing in the first region 110 S750.

The target-tracking unit 240 continuously notifies the control unit 230 of the tracking result so that the control unit 230 can check whether tracking is possible S760. If tracking is impossible, the control unit 230 causes the positioning unit 220 to position the user, the first region 110, and the second region 120 again S730.

While the tracking goes on without interruption, the target-tracking unit 240 measures the trajectory of a gesture made with the first body part 111 S770, and transmits the trajectory to the control unit 230.

The control unit 230 forwards the trajectory to the gesture-recognition unit 260, which checks whether the gesture is effective based on the trajectory S780. Particularly, the gesture-recognition unit 260 analyzes the characteristics of the trajectory and determines whether the analyzed characteristics conform to one of gesture codes stored in the storage unit 250. If there is a correspondence, the gesture-recognition unit 260 extracts a corresponding function signal from the storage unit 250 S790 and transmits it to the control unit 230.

The signal output unit 270 outputs the function signal S800 so that the function-performing apparatus 150, which is connected to the gesture-tracking apparatus 200, performs a function corresponding to the function signal.

Figure 8:
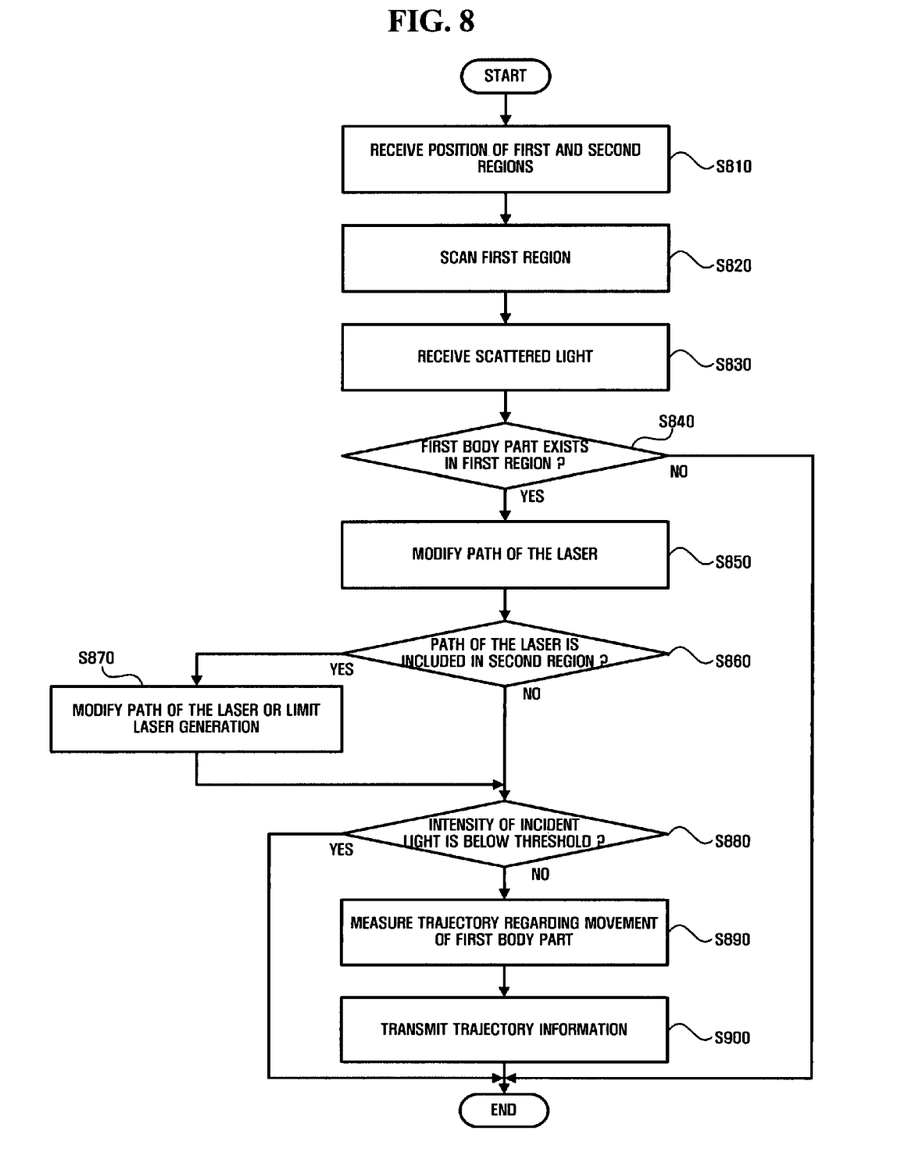
FIG. 8 is a flowchart showing a process of tracking a first body part according to an exemplary embodiment.

FIG. 8 is a flowchart showing a process of tracking a first body part according to an exemplary embodiment.

In order to track the first body part 111 of the user, the laser control unit 330 of the target-tracking unit 240 receives information regarding the position of the first and second regions 110 and 120 from the control unit 230 S810.

The laser control unit 330 causes the laser-beam-generation unit 310 to generate lasers and controls the path-modification unit 320 so as to scan the first region 110 S820. Particularly, the angle of the reflection mirror of the path-modification unit 320 is modified so that the entire first region 110 is successively irradiated with lasers. As a result, the lasers are reflected by an object existing in the first region 110, and the resulting scattered light is received by the light-reception unit 340 S830.

The received light is transmitted to the laser control unit 330, which then analyzes the intensity and type of the light and determines whether the first body part 111 exists in the first region 110 S840. If the first and second regions 110 and 120 overlap each other, the laser control unit 330 may control the path-modification unit 320 so that the overlapping region is not scanned.

If the first body part 111 is detected from the scanning result, the laser control unit 330 controls the path-modification unit 320 so as to modify the path of the laser and ensure that the first body part 111 is irradiated with lasers without interruption S850. Particularly, the laser control unit 330 determines whether the first body part 111 has moved with reference to the intensity and type of the scattered light inputted to the light-reception unit 340. Based on the result of determination, the laser control unit 330 causes the path-modification unit 320 to adjust the angle of the reflection mirror.

The laser control unit 330 continuously monitors if the path of the laser, when modified, is included in the second region 120 S860. If so, the laser control unit 330 controls the path-modification unit 320 so as to keep the path of the laser away from the second region 120 or causes the laser-beam-generation unit 310 to stop generating laser beams S870.

In addition, the laser control unit 330 continuously monitors the intensity of scattered light incident on the light-reception unit 340 to determine if it has dropped below a threshold S880. If so, the laser control unit 330 notifies the control unit 230 of the result and aborts the tracking process.

The trajectory measurement unit 350 receives information regarding the intensity and type of the scattered light incident on the light-reception unit 340, as well as the path of the laser modified by the path-modification unit 320. Based on the received information, the trajectory measurement unit 350 measures the trajectory concerning the movement of the first body part 111 in the three-dimensional space S890.

The laser control unit 330 receives information regarding the measured trajectory and forwards it to the control unit 230 S900.

In addition to the above-described exemplary embodiments, exemplary embodiments can also be implemented by executing computer readable code/instructions in/on a medium/media, e.g., a computer readable medium/media. The medium/media can correspond to any medium/media permitting the storing and/or transmission of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter. In addition, code/instructions may include functional programs and code segments.

The computer readable code/instructions can be recorded in/on a medium/media in a variety of ways, with examples of the medium/media including magnetic storage media (e.g., floppy disks, hard disks, magnetic tapes, etc.), optical media (e.g., CD-ROMs, DVDs, etc.), magneto-optical media (e.g., floptical disks), and hardware storage devices (e.g., read only memory media, random access memory media, flash memories, etc.) which may include computer readable code/instructions, data files, data structures, etc. The medium/media may also be a distributed network, so that the computer readable code/instructions are stored and executed in a distributed fashion. The computer readable code/instructions may be executed by one or more processors. The computer readable code/instructions may also be executed and/or embodied in at least one application specific integrated circuit (ASIC) or Field Programmable Gate Array (FPGA).

In addition, one or more software modules or one or more hardware modules may be configured in order to perform the operations of the above-described exemplary embodiments.

The term "module", as used herein, denotes, but is not limited to, a software component, a hardware component, a plurality of software components, a plurality of hardware components, a combination of a software component and a hardware component, a combination of a plurality of software components and a hardware component, a combination of a software component and a plurality of hardware components, or a combination of a plurality of software components and a plurality of hardware components, which performs certain tasks. A module may advantageously be configured to reside on the addressable storage medium/media and configured to execute on one or more processors. Thus, a module may include, by way of example, components, such as software components, application specific software components, object-oriented software components, class components and task components, processes, functions, operations, execution threads, attributes, procedures, subroutines, segments of program code, drivers, firmware, microcode, circuitry, data, databases, data structures, tables, arrays, and variables. The functionality provided for in the components or modules may be combined into fewer components or modules or may be further separated into additional components or modules. Further, the components or modules can operate at least one processor (e.g. central processing unit (CPU)) provided in a device. In addition, examples of a hardware components include an application specific integrated circuit (ASIC) and Field Programmable Gate Array (FPGA). As indicated above, a module can also denote a combination of a software component(s) and a hardware component(s). These hardware components may also be one or more processors.

The computer readable code/instructions and computer readable medium/media may be those specially designed and constructed for the purposes of exemplary embodiments, or they may be of the kind well-known and available to those skilled in the art of computer hardware and/or computer software.

As mentioned above, the apparatus, method, and medium for tracking a gesture has the following advantages.

First, after a user is positioned approximately based on image-processing technology, a specific part of the user's body is tracked continuously by using laser technology. The positioning of the user and the tracking of a specific part of the user's body are conducted rapidly.

Second, when a specific part of the user's body is tracked by using lasers, sensitive parts of the user's body (e.g., eyes) are excluded from the tracking target. This avoids injuries resulting from exposure to lasers.

Although a few exemplary embodiments have been shown and described, it would be appreciated by those skilled in the art that changes may be made in these exemplary embodiments, the scope of which is defined in the claims and their equivalents.

What is claimed is:

1. A gesture-tracking apparatus comprising:
    a positioning unit to position a user to appear in an inputted image and to position a first and second predetermined region with reference to the positioned user; and
    a target-tracking unit to track a first body part existing in the first predetermined region of the user in the inputted image,
    wherein the target-tracking unit comprises:
        a laser-beam-generation unit to generate a laser beam;
        a laser control unit to control the laser-beam generation unit to scan the first body part; and
        a path-modification unit to modify a path of the laser beam so that the laser beam is directed to the first body part, and
    wherein the laser control unit is adapted to control the path of the laser beam away from the second predetermined region, if when tracking the first body part the path of the laser beam is directed to the second predetermined region which includes a second body part.

2. The gesture-tracking apparatus of claim 1, wherein the positioning unit is adapted to position the user by using image processing.

3. The gesture-tracking apparatus of claim 1, wherein the target-tracking unit further comprises at least one of:
    a light-reception unit to receive light resulting from scattering of the laser beam directed to the first body part; and
    a trajectory measurement unit to measure a movement trajectory of the first body part with reference to an intensity of the received light and the modified emission path.

4. The gesture-tracking apparatus of claim 3, wherein the laser control unit is adapted to determine that tracking of the first body part is not possible when the intensity of the received light is below a threshold.

5. The gesture-tracking apparatus of claim 4, wherein the positioning unit is adapted to position the user in the inputted image when tracking of the first body part is not possible.

6. The gesture-tracking apparatus of claim 3, further comprising a gesture-recognition unit to recognize a gesture of the first body part by using the measured movement trajectory.

7. The gesture-tracking apparatus of claim 6, further comprising a signal output unit to output a signal based on the recognized gesture.

8. The gesture-tracking apparatus of claim 1, wherein the path of the laser beam is parallel to an input direction of the image.

9. The gesture-tracking apparatus of claim 1, wherein the laser control unit is adapted to limit generation of the laser beam if when tracking the first body part the path of the laser beam is directed to the second predetermined region which includes the second body part.

10. The gesture-tracking apparatus of claim 1, wherein the first body part comprises at least one body part having priority among body parts of the user.

11. The gesture tracking apparatus of claim 1, wherein the laser-beam generation unit generates laser beams along a circle with a predetermined radius.

12. The gesture tracking apparatus of claim 11, wherein the predetermined radius varies depending on the distance between the first body part and the gesture tracking apparatus.

13. The gesture tracking apparatus of claim 1, wherein the path-modification unit further comprises one or more reflection mirrors and one or more driving units to modify an angle of the one or more reflection mirrors to modify the path of the laser-beam.

14. A gesture-tracking method comprising:
    positioning a user to appear in an inputted image using at least one processor;
    positioning a first and second predetermined region with reference to the positioned user; and
    tracking a first body part existing in the first predetermined region of the user in the inputted image;
    generating a laser beam;
    scanning the first body part using the generated laser beam;
    modifying a path of the laser beam so that the laser beam is directed to the first body part; and
    controlling the path of the laser beam away from the second predetermined region, if when tracking the first body part the path of the laser beam is directed to the second predetermined region which includes a second body part.

15. The gesture-tracking method of claim 14, wherein the positioning is based on image processing.

16. The gesture-tracking method of claim 14, wherein the tracking the first body part further comprises at least one of:
    receiving light resulting from scattering of the laser beam directed to the first body part; and
    measuring a movement trajectory of the first body part with reference to the intensity of the received light and the modified path.

17. The gesture-tracking method of claim 16, which further comprises determining that tracking of the first body part is not possible when the intensity of the received light is below a threshold.

18. The gesture-tracking method of claim 17, wherein the user is positioned when tracking of the first body part is not possible.

19. The gesture-tracking method claim 16, which further comprises recognizing a gesture of the first body part by using the measured movement trajectory.

20. The gesture-tracking method of claim 19, which further comprises outputting a signal based on the recognized gesture.

21. The gesture-tracking method of claim 14, wherein the path of the laser beam is parallel to an input direction of the image.

22. The gesture-tracking method of claim 14, which further comprises limiting generation of the laser beam if when tracking the first body part the path of the laser beam is directed to the second predetermined region which includes the second body part.

23. At least one non-transitory computer readable medium storing computer readable instructions that control at least one processor to implement the method of claim 14.

24. The gesture tracking method of claim 14, wherein the first body part comprises at least one body part having priority among body parts of the user.

25. A gesture tracking apparatus comprising:
    a positioning unit to position a user, having a first body part and a second body part, to appear in an inputted image;
    a target-tracking unit to track the first body part; and
    a control unit to control a path-modification unit to modify a path of a laser beam so that the laser beam is directed toward the first body part and to control the path of the laser beam away from the second body part if when tracking the first body part the path of the laser beam is directed to the second body part.

26. The gesture tracking apparatus of claim 25, further comprising:
    a light-reception unit to receive light resulting from scattering of the laser beam directed to the first body part; and
    a trajectory measurement unit to measure a movement trajectory of the first body part with reference to an intensity of the received light and the modified emission path.

* * * * *

UNITED STATES PATENT AND TRADEMARK OFFICE
CERTIFICATE OF CORRECTION

| | |
|---|---|
| PATENT NO. | : 8,009,865 B2 |
| APPLICATION NO. | : 11/896110 |
| DATED | : August 30, 2011 |
| INVENTOR(S) | : Kyu-yong Kim et al. |

It is certified that error appears in the above-identified patent and that said Letters Patent is hereby corrected as shown below:

Column 12, Line 4, In Claim 19, after "method" insert --of--.

Signed and Sealed this
Thirty-first Day of January, 2012

David J. Kappos
*Director of the United States Patent and Trademark Office*